J. A. BOWDEN.
TIRE WITH DETACHABLE TREAD.
APPLICATION FILED MAR. 9, 1910.
1,054,820.
Patented Mar. 4, 1913.
3 SHEETS—SHEET 1.
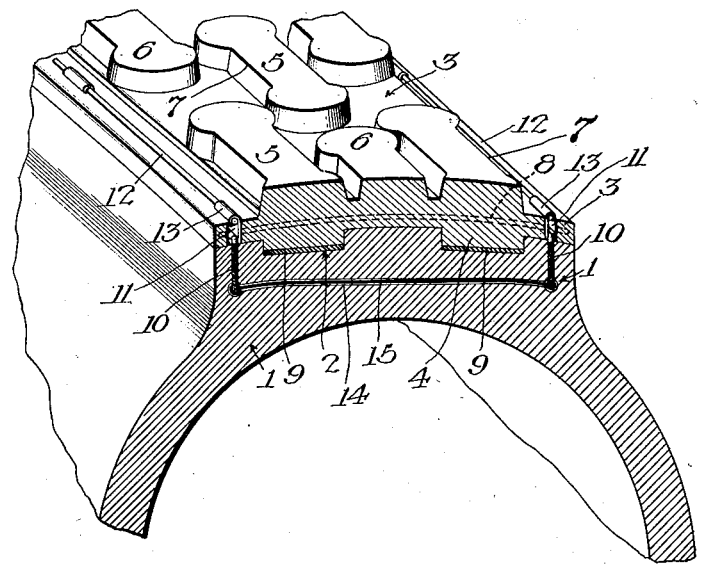
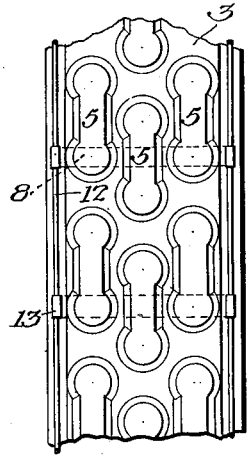
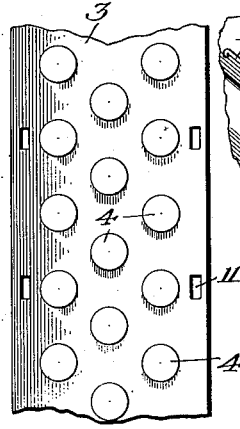
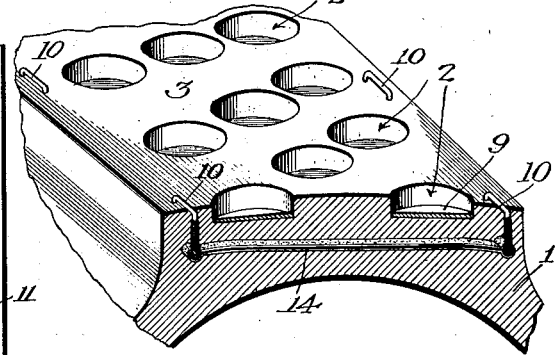
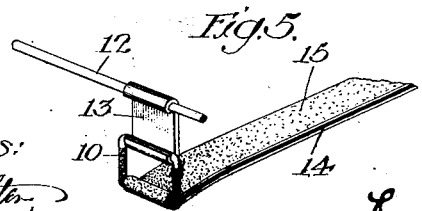
Witnesses:
Inventor:
Junius A. Bowden,

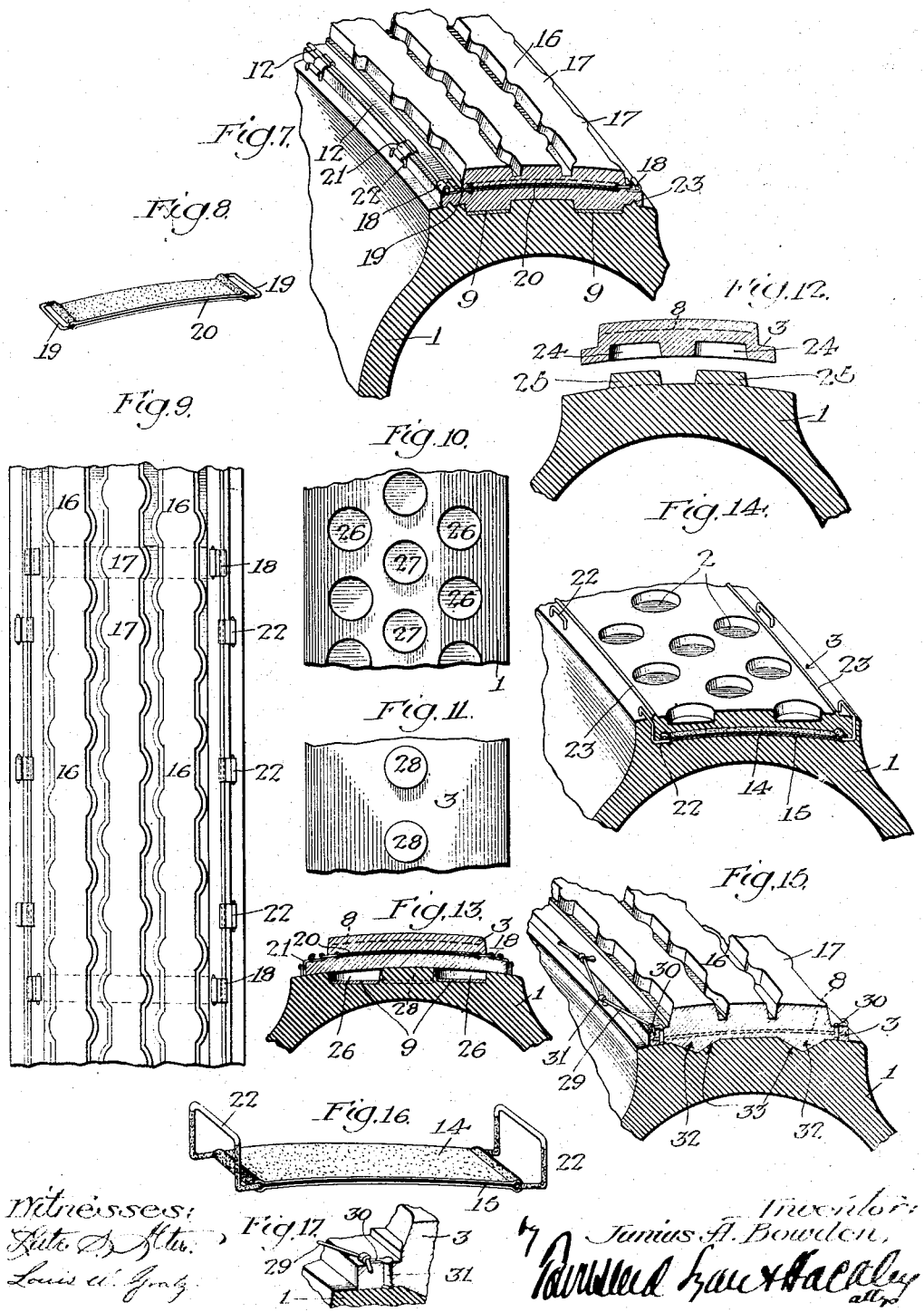

J. A. BOWDEN.
TIRE WITH DETACHABLE TREAD.
APPLICATION FILED MAR. 9, 1910.
1,054,820.
Patented Mar. 4, 1913.
3 SHEETS—SHEET 3.
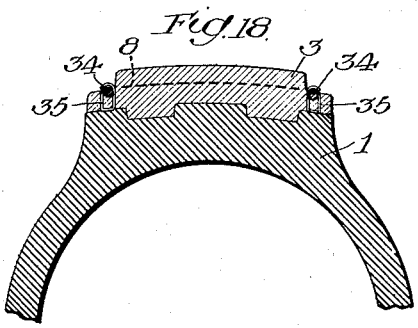
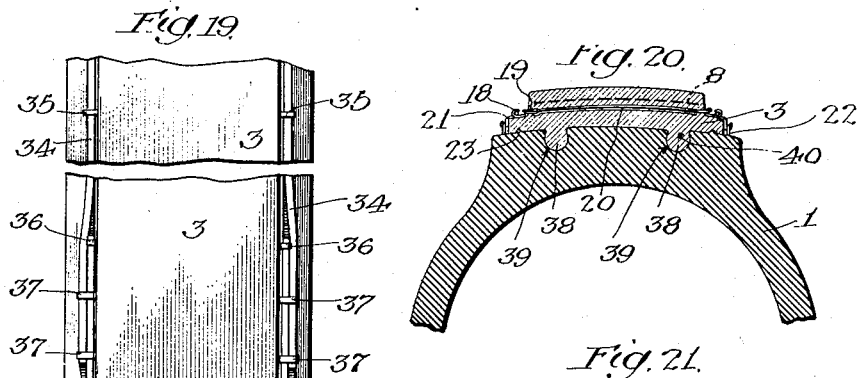
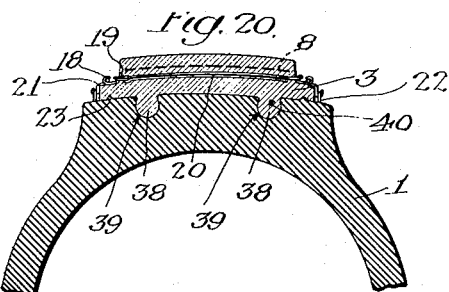
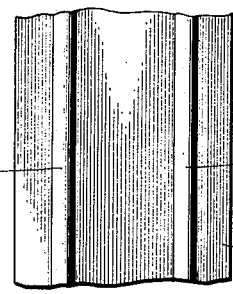
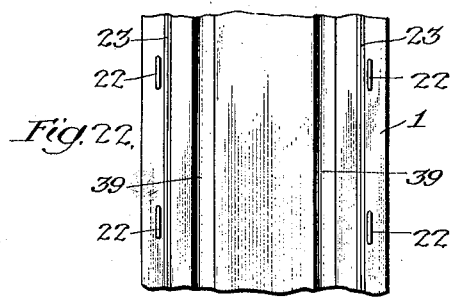
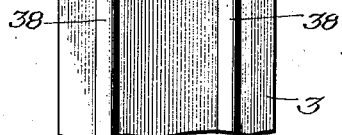
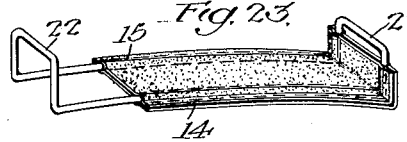

UNITED STATES PATENT OFFICE.

JUNIUS A. BOWDEN, OF LOS ANGELES, CALIFORNIA.

TIRE WITH DETACHABLE TREAD.

1,054,820.  Specification of Letters Patent.  Patented Mar. 4, 1913.

Application filed March 9, 1910. Serial No. 548,313.

*To all whom it may concern:*

Be it known that I, JUNIUS A. BOWDEN, a citizen of the United States, residing at Los Angeles, in the county of Los Angeles and State of California, have invented a new and useful Tire with Detachable Tread, of which the following is a specification.

This invention relates to a rubber tire having a detachable tread; the tread being in the form of a band and encircling the tire and receiving the wear and preferably having an anti-skid surface. Means are provided for detachably securing the tread to the tire so that when the tread becomes worn or damaged, it may be removed from the body of the tire and a new tread substituted, thereby saving the main part of the tire and resulting in great economy.

One of the main objects of the invention is to provide efficient means secured in the tire for holding the tread to the body of the tire in such a manner that the tread at its outer edges will bind tightly to the tire, preventing foreign matter from entering between the tire and tread, and yet can be readily detached when desired.

A further object is to provide novel and effective means for preventing the detachable tread portion from shifting relatively to the tire either circumferentially or transversely of the tire.

In previous applications of mine, filed April 16, 1908, Serial No. 427,544, and May 25, 1909, Serial No. 498,363, I have shown a detachable tread portion in the form of a band which encircles the tire and a wire is employed at each edge of the band to assist in retaining the same and to bind the edges of the band tightly against the tire.

The present invention relates to improved means for securing the tread portion and to improved interlocking devices for holding the tread portion in position.

A further object is to provide means for minimizing punctures.

Referring to the drawings, Figure 1 is a perspective view, partly in section, of a portion of one form of the invention; Fig. 2 is a plan view on a reduced scale of the tread portion; Fig. 3 is a view of the inner face of the tread portion; Fig. 4 is a view, similar to Fig. 1, with the tread portion removed; Fig. 5 is a perspective view of portions of the detachable holding devices; Fig. 6 is a perspective view of one of the hard disks; Fig. 7 is a view, similar to Fig. 1, showing another form of the invention; Fig. 8 is a perspective view showing a form of fastening device used in the detachable tread of Fig. 7; Fig. 9 is a plan view of the form shown in Fig. 7; Fig. 10 is a view of the inside face of the tread portion of Fig. 7; Fig. 11 is a plan view of a portion of the inside face of the tread for the tire of Fig. 13; Fig. 12 is a sectional view of another form, showing the tread portion slightly lifted; Fig. 13 is a cross section of another form; Fig. 14 is a perspective view, partly in section, of the base formed with the tread removed; Fig. 15 is a perspective view, partly in section, of another form; Fig. 16 is a perspective, in detail, of one of the fastening devices employed in Fig. 14; Fig. 17 is a perspective view, partly in section, on an enlarged scale, of part of the fastening device employed in Fig. 15; Fig. 18 is a sectional view through another form; Fig. 19 is a plan view of the form shown in Fig. 18; Fig. 20 is a cross section through another form; Fig. 21 is a view of the inner face of the detachable tread portion of Fig. 20; Fig. 22 is a plan view of the base of the tire of Fig. 20; and Fig. 23 is a detail in perspective, showing another form of fastening device.

In the form shown in Fig. 1, 1 designates the base of a tire which is provided with pockets 2, the base 1 of the tire being formed of the usual tire material, consisting of rubber with cotton or other fabric located within it at desired points. The outer face of the base 1 is nearly flat in transverse section, but may be made of any curvature desired.

3 designates the detachable tread portion which consists of a band which completely encircles the tire and the inner face of which is provided with projecting lugs 4 which fit within the pockets 2 in the base of the tire whereby the tread portion 3 is positively locked mechanically from moving circumferentially of the tire or transversely thereto. The outer wearing surface of the tread portion 3 may be provided with projections 5, as shown in Figs. 1 and 2, or with any other form of projection, or the tread surface may be simply a plain surface, if desired.

I preferably employ the projections 5, and provide them with enlarged circular end portions 6 which are united by an intermediate straight portion 7, and the lugs 5 are staggered, as clearly shown. These may be arranged in two or more rows, as desired.

The tread portion 3 is preferably formed of rubber and is reinforced by cotton or other fabric 8, as indicated in Fig. 1.

In order to minimize puncture, disks 9 of some hard substance, for example, hard fiber, are placed in the pockets 2 and lie immediately below the lugs 4. The disks 9 prevent a nail or other sharp thing from passing completely through the tire portion.

The tread portion may be secured to the base of the tire in various ways, in the form referred to, being secured by means of loops 10 which are embedded in the base 1, and which project into slots 11 in the tread portion 3.

A wire or cord 12 extends along the outer edge of the detachable tread portion 3 on the upper surface thereof, and is connected with the loops 10 by metal hooks 13 which extend into the slots 11. The loops 10 are arranged preferably in pairs, each pair being connected by a strip of fabric 14 which is covered with rubber 15 and vulcanized in the base of the tire, the ends of the fabric being secured to the loop in any desired manner, as by doubling over the loop. One very desirable manner in which to construct this feature is to double the canvas upon itself, as clearly shown in Fig. 5, with a rubber layer between the two folds and reinforced with fabric at point of contact around the loop.

The loops 10 and canvas 15 will be placed in the base of the tire during the construction of the tire, thus permanently incorporating them in the base portion of the tire.

In the fastening device shown in Fig. 23 the fabric and rubber is carried up at the ends of the device to near the top of the loop, leaving only a sufficient portion of the loop exposed, being that part of the loop which protrudes above the rubber in which the device is embedded. In this form, the two loops are formed from a single piece of wire 22 at each end thereof, and the canvas and rubber envelop the device except as to the protruding ends, as explained, the fabric being stitched, as indicated, to hold it in position.

The detachable tread portion 3 is secured to the tire body as follows:—First the tire is removed from the wheel, is then collapsed, and the tread portion fitted over with the lugs registering with the pockets. The tire with the tread is then placed on the wheel. The wires 12 are then laid in position. The tire is then inflated to a higher pressure than would ordinarily be used. This shortens the distance between the wire 12 and loop 10 by reason of the tread portion being of less extensibility than the base portion of the tire, so that the extension of the base portion forces it into intimate contact with the inner surface of the tread portion. While in this condition, the hooks 13 are connected, the lower ends of the hooks having first been connected with the loops 10 and while the distance between the loops 10 and the wires 12 is the least, the tire being under abnormal pressure, the upper ends of the hooks are bent over the wires 12 thereby securely attaching and binding the tread portion. If desired, strong cord may be used to bind the loop 10 to the wires 12. The tread portion having been secured, the pressure in the tire is reduced to normal pressure and during such reduction of pressure the contraction of the base of the tire increases the distance between the loops 10 and wires 12, thereby placing a greater tension on the hooks 13 and the more securely fastening the tread portion in place. From this it will be apparent that after the tread has been attached, that should the tire become deflated, the tread portion will be more tightly held than when the tire is under normal pressure or even greater pressure.

In all cases it will be noted that the wearing surface of the tread extends above the binding means whether it be the hooks 13 and wires 12 or other devices which may be employed and thus protect the binding device from wear, as the tread 3 will be replaced with a new one when the projections have been worn down to such an extent so that further wear would be received by the binding devices, at the same time securing the advantages of an antiskid feature.

In the form shown in Figs. 7, 8 and 9, the construction is quite similar. In this form, the outer projections on the tread portion 3 comprise continuous ribs 16 placed at intervals, and having convex projections or enlargements 17. This plan is not intended to afford additional security for holding wires 12, but is for easy access to wires 12 from loops 22, not depending on any predetermined location for either the loops 22 of the tire or of loop 19 of the tread. In this form additional security is obtained by providing means for preventing the wires or cords 12 from lateral displacement outwardly. I accomplish this by means of hooks 18, the outer ends of which engage the wires 12, the inner ends of the hooks 18 being engaged with loops 19 which extend in substantially a horizontal plane and are arranged in pairs and connected by a strip of fabric 20 which extends directly across through the tread portion 3.

Fig. 8 shows the cross fabric 20 and loops 19 in detail. The hooks 13 are also secured in a slightly different manner to the preceding form, being bent over the outer corners and edges of the tread portion 3, and their lower ends engaged with loops 22 which are anchored in the base of the tire and are L- shaped, as shown in Figs. 14 and 16, in order to bring their protruding portions at the outside edges of the tread portion 3, this construction avoiding the use of the slots 11 used in the previous form. I bind fabric around and to a special form of metal, as in Figs. 5, 16 and 23, covering the metal completely, where it is to be secured in the rubber, and then vulcanizing the fabric containing the metal holders into the tire. I preferably use a metal holder in the forms shown, but do not limit myself to these forms. The loops 22 may be connected by canvas 14 and rubber 15, as in the previous form. Strong cord may be substituted for the metal hooks if desired.

In order to more thoroughly seal the crack between the outer edges of the tread portion 3 and the base 1, and the more perfectly prevent the entrance of foreign matter, I provide small projecting ribs 23 on the base 1, as clearly shown in Fig. 14, which are compressed against the under face of the tread portion when the latter is secured in position. It should be understood that the tread portion is not recessed to receive the ribs 23 but that the ribs themselves are compressed somewhat, and at the same time the inner face of the tread portion 3 is indented somewhat by the ribs 23, so that a very tight joint is secured.

In the form shown in Fig. 12, I have indicated a slight variation, applicable to any of the forms herein, in which the tread portion 3 is not provided with lugs as in the previous forms, but is provided with pockets 24 only, while the base 1 is provided with lugs 25, there being no pockets in the base 1. In Fig. 12, the tread portion 3 is shown lifted to reveal the absence of lugs thereon. When in position, the lugs 25 are securely fitted within the pockets 24 in the tread portion 3.

Fig. 13 shows a slight variation over previous forms in that the base 1 is provided with three rows of pockets 26 and 27, the pockets 27 receiving lugs 28 formed on the tread portion 3, as shown in Fig. 11, while the pockets 26 on each side of the row of pockets 27 are open and help to grip the tread when the weight of the machine is on the tread, therefore the row of open pockets provides means of gripping the tire but of less degree than the lugs, but thought sufficient for a plain tread which does not receive the strain an anti-skid tread would. The empty pockets promote flexibility of the base 1 and at the same time economizing rubber to a large extent. The pockets are provided with false bottoms of puncture proof material 9.

In the form shown in Fig. 15, the detachable tread portion is secured to the base 1 by means of wires or cords 29 which are laced back and forth between hooks 30 on the tread portion and hooks 31 on the base, as shown in Fig. 15. In this form, the hooks are secured by fabric, in a manner similar to that shown in Fig. 16.

Fig. 17 shows the detail construction of a hook, the shank 31 of which is riveted through the tread portion 3. In this form of Fig. 15 I have also indicated that the interlocking lugs and pockets between the tread portion and base may be conical instead of cylindrical, as in previous forms, 32 indicating the conical lugs and 33 indicating the conical pockets which receive the conical lugs.

In the form shown in Fig. 18, I have shown another method of fastening the tread portion 3 to the base 1, which consits of extending a wire or cord 34 around each edge of the tread portion and laid in a groove therein, the wires 34 being held in place by clencher staples 35, and the ends of the wires being held by clencher staples 36 and 37; the clencher staples 36 confining a single end of the wire 35, and clencher staples 37 passing over both overlapping ends. In this form it will be understood that the interlocking lugs and pockets hold the tread portion 3 against circumferential or lateral movement, while the wires 34 hold the tread portion 3 from radial movement, thereby insuring that the lugs remain in the pockets, thus positively securing the tread portion in place.

Figs. 20, 21 and 22 show another form in which the tread portion 3 is provided with continuous ribs 38 which are received by continuous grooves 39 formed on the base 1. The ribs 38 are joined with the tread portion 3 by neck portions 40 of slightly less width than the grooves 39 thus aiding in interlocking the parts. In this form the same means of loop attachment may be employed to bind the outer edges together, as in previous forms described.

What I claim is:—

1. In a tire having a detachable tread, metallic members secured in the tire, a wire encircling each edge of the tread, said members connected to said wire, as means of binding the edges of the tread to the edges of the tire and in a direction toward the axis of the tire, for tightly closing the division between the tread and tire.

2. In a tire comprising two rubber parts, a body part and a detachable tread part, the body part having a recess and the tread part having a projection on its under side, a wire on each edge of the tread bearing against the outside of said tread, means for holding said wire from displacement, a series of holding members attached to fabric and the fabric vulcanized in the body part and extending to the surface thereof, said projection of the tread fitting into the recess of the body part, and connection between the holding members and wire for joining said parts together.

3. As a new article of manufacture, a detachable tread for rubber tires comprising a band, said band having a protuberance on its outer surface, a fabric strip having a holding member secured to each end thereof, said strip being vulcanized in the tread and the holding members extending to the surface approximately at the base of the protuberances, as means of detachably securing the tread to a tire.

4. In rubber tires, a detachable wire encircling the edges of a detachble tread as means for binding the tread to the tire, said tread in the form of a band and having a protuberance on its outer surface, said wire bearing against said tread approximately at the base of said protuberance, and attachment members for holding said wire from displacement.

5. In rubber tires, a detachable tread encircling the tire, said tread in the form of a band and having a protuberance on its outer surface near its edges, holding members secured approximately at the base of said protuberance, a tire having holding members secured in its body and extending to the surface thereof, connections between said members of the tread and said members of the tire for binding the tread closely to the tire, said connections being joined externally.

6. In a tire, a base portion, a detachable tread portion encircling the base portion, said tread portion having a marginal portion on each side with a substantially flat outer face, a wire extending around the tire and lying against the outer face of each marginal portion, fastening devices protruding through the outer face of the tread portion, means connecting each wire at intervals with the associated protruding fastening devices, bands extending laterally through the tread portion and connected to the wires at intervals to prevent lateral spreading of said wires, and bands vulcanized within the base portion and connecting fastening devices on opposite sides.

7. In a tire, a base portion formed with a circumferential outer part having a substantially flat outer face, a series of bands extending substantially straight, laterally in said circumferential outer portion and the ends of said bands terminating near the sides of said outer portion and lying within the outer portion, loops secured to the ends of said bands within said outer portion and protruding through the outer face of said portion, a detachable tread portion lying against said base portion, the said outer circumferential portion and the said tread portion being formed with interfitting means preventing lateral or circumferential displacement of the tread portion, said tread portion having circumferential marginal protuberances which rest against the outer face of the said circumferential outer portion of the base, wires extending circumferentially around the tread portion and lying close against the outer faces of the circumferential marginal protuberances, fastening devices connecting said wires at intervals with the associated protruding loops, and means within said tread portion and connected externally with said wires for preventing lateral displacement of said wires.

8. In a tire, a base portion formed with a circumferential outer part having a substantially flat outer face, a series of bands extending substantially straight laterally in said circumferential outer portion and the ends of said bands terminating near the sides of said outer portion and lying within the outer portion, loops secured to the ends of said bands within said outer portion and protruding through the outer face of said portion, a detachable tread portion lying against said base portion, the said outer circumferential portion and the said tread portion being formed with interfitting means preventing lateral or circumferential displacement of the tread portion, said tread portion having circumferential marginal protuberances which rest against the outer face of the said circumferential outer portion of the base, wires extending circumferentially around the tread portion and lying close against the outer faces of the circumferential marginal protuberances, fastening devices connecting said wires at intervals with the associated protruding loops, and bands extending laterally within said tread portion and terminating within the outer edges thereof, and hooks secured to the ends of the latter bands and protruding from the tread portion, said hooks being connected to said wires at intervals intermediate of said fastening devices.

In testimony whereof, I have hereunto set my hand at Los Angeles, Cal., this 1st day of March, 1910.

JUNIUS A. BOWDEN.

In presence of—
G. T. HACKLEY,
FRANK L. A. GRAHAM.